Feb. 12, 1935.  J. L. BROWN  1,991,079

SPEED CONTROL APPARATUS

Filed May 11, 1933     2 Sheets-Sheet 1

WITNESSES:

INVENTOR
John L. Brown
BY
ATTORNEY

Feb. 12, 1935.   J. L. BROWN   1,991,079
SPEED CONTROL APPARATUS
Filed May 11, 1933   2 Sheets-Sheet 2
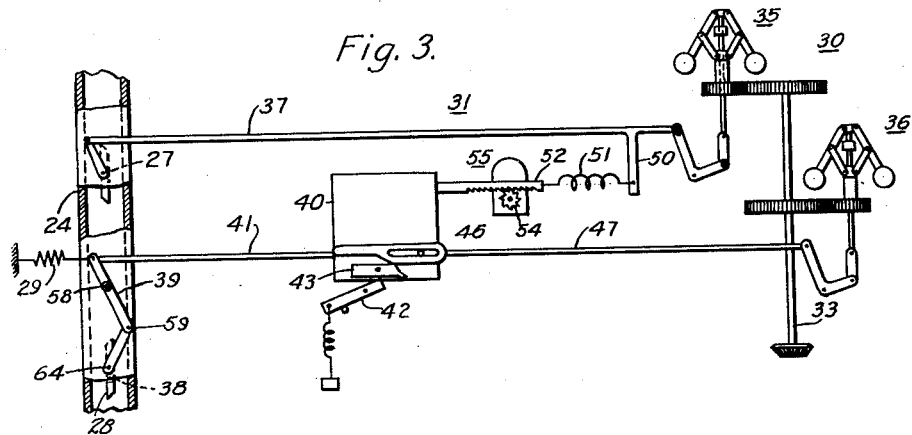
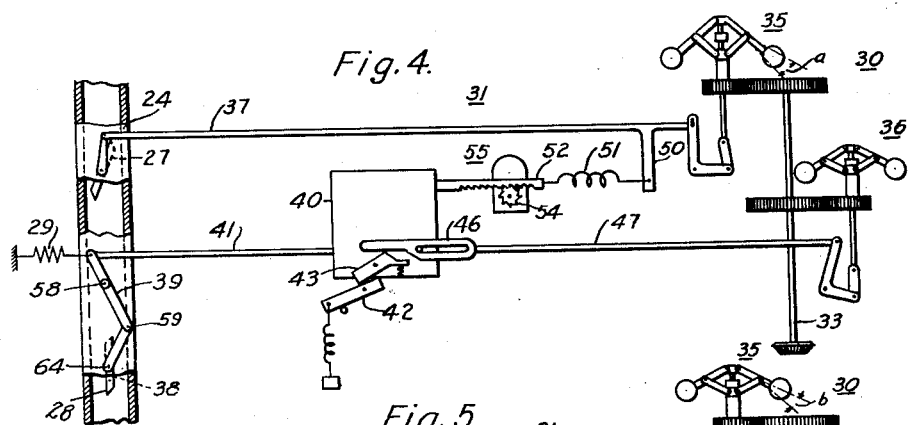
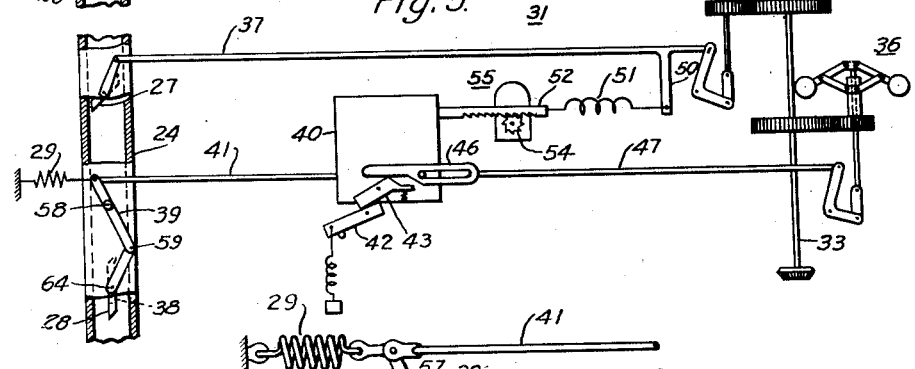
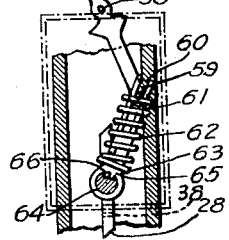
WITNESSES:
Fred C. Witham
RR Lockwood
INVENTOR
John L. Brown
BY
G. M. Crawford
ATTORNEY Patented Feb. 12, 1935

1,991,079

UNITED STATES PATENT OFFICE 1,991,079

SPEED CONTROL APPARATUS

John L. Brown, Verona, Pa., assignor to Westinghouse Electric & Manufacturing Company, East Pittsburgh, Pa., a corporation of Pennsylvania Application May 11, 1933, Serial No. 670,490

16 Claims. (Cl. 123—108)

My invention relates, generally, to internal combustion engines and, more particularly, to apparatus for controlling the speed of such engines.

This application is a continuation in part of application Serial No. 648,198, filed December 21, 1932, by myself and John H. Blankenbuehler, and assigned to the Westinghouse Electric & Manufacturing Company.

The object of my invention, generally stated, is to provide speed control apparatus for internal combustion engines which shall be simple and efficient in operation and which may be readily and economically manufactured and installed.

The principal object of my invention is to provide for maintaining the operation of an internal combustion engine at full speed for a predetermined time after load is removed from the engine.

Another object of my invention is to provide for rendering time-delay apparatus, used for reducing the operating speed of an internal combustion engine to idling speed after the expiration of a predetermined time interval, ineffective on reapplication of load during the time interval.

Other objects of my invention will in part be obvious and in part appear hereinafter.

My invention, accordingly, is disclosed in the embodiment hereof shown in the accompanying drawings and comprises the features of construction, combination of elements, and arrangement of parts, which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which:

Figs. 2, 3, 4 and 5 illustrate various operating conditions of the speed control apparatus embodied in my invention.

Figure 1:
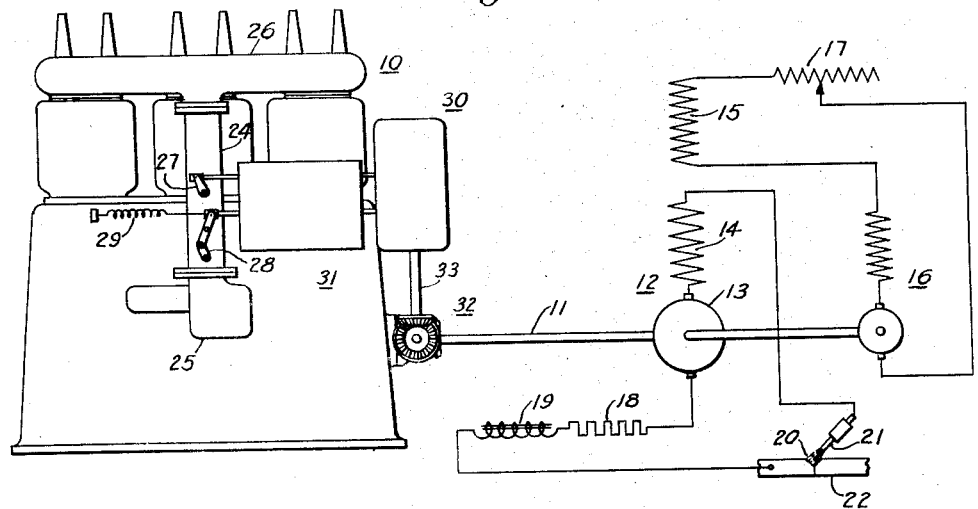
Figure 1 is a view, in side elevation and, in part, diagrammatically, illustrating one embodiment of my invention.

Referring now particularly to Fig. 1 of the drawings, the reference character 10 illustrates, generally, an internal combustion engine of any suitable type which is connected by means of a drive shaft 11 to drive a load such as may be applied by means of a welding generator, illustrated generally at 12. It will be understood, however, that my invention may also be used in connection with loads of other types, such as air compressors, pumps or the like, and, therefore, it will be understood that the scope of the application of this invention is not limited to the control of internal combustion engines for driving welding generators.

The welding generator 12 comprises an armature 13 and a differential series field winding 14. A main field winding 15 may be energized from a series-connected exciter-generator, illustrated generally at 16, which may be mounted on the shaft 11, as illustrated. A variable resistor 17 is provided for changing the amount of current that is supplied for exciting the field winding 15. The welding circuit from the generator includes the customary resistor 18 and inductor 19, which serve to stabilize the operation of a welding arc 20, which is maintained between a welding electrode 21 and work 22 on which the welding operation is to be performed.

The internal combustion engine 10 is provided with a fuel inlet pipe 24, which serves to connect a carburetor 25 to an intake manifold 26, as will be readily understood. The flow of fuel from the carburetor 25 may be controlled by means of an operating valve 27 and an idling valve 28, the particular construction and functioning of which will be illustrated and described hereinafter. A tension spring 29 is provided for biasing the idling valve 28 to the open position.

In order to control the speed of the internal combustion engine 10 in accordance with variations in the load which may occur due to variations in the current supplied for maintaining the welding arc 10, or in the case of an air compressor to control the speed of the engine 10 in accordance with the load applied thereto, a governor, illustrated generally at 30, is provided and is connected to the valves 27 and 28 by means of an interconnecting mechanism illustrated generally at 31. The governor 30 may be mechanically connected to be driven by means of the shaft 11 through suitable bevel gears, illustrated generally at 32, as will be readily understood. The bevel gears 32 are connected to drive a shaft 33 which serves to operate the mechanism of the governor 30.

Figure 2:
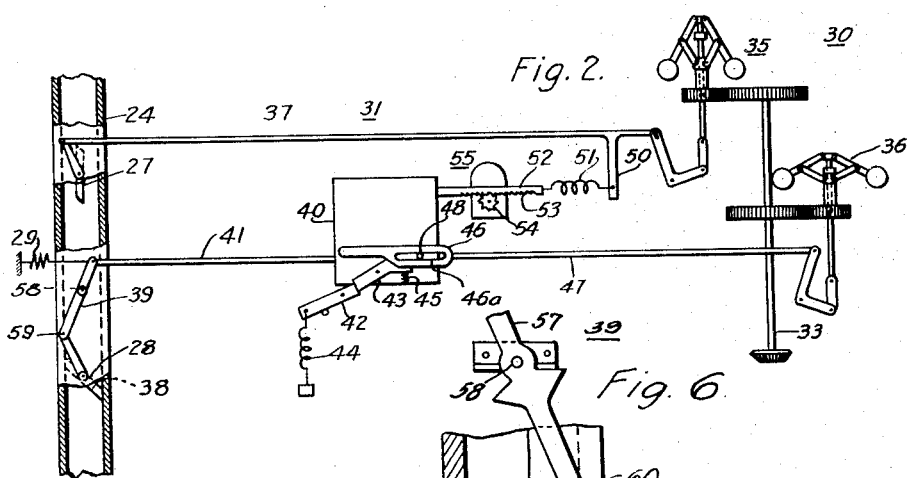

Referring now particularly to Fig. 2 of the drawings, it will be observed that the governing and interconnecting apparatus is shown in more detail. The governor 30 comprises a high-speed governor 35 and a low-speed governor 36, which are arranged to be driven through suitable gears, as illustrated, by means of the shaft 33. The high-speed governor 35 is arranged to be sensitive only to speeds within the operating range of the engine 10, while it is driving the load in order to maintain the speed of the engine within the predetermined range. The low-speed governor 36 is arranged to be sensitive to relatively low speeds or idling speeds, and is ineffective to provide any control functions when the engine speed is above idling speed.

More particularly, the high-speed governor 35 may be arranged, for example, to maintain the speed of the engine 10 at approximately 1500 revolutions per minute over conditions ranging from light load to full load as applied to the engine 10. Assuming that the idling speed of the engine 10 is in the neighborhood of 500 revolutions per minute, the low-speed governor 36 is arranged to be sensitive to changes in speed below this idling speed. While the engine 10 is operating at a speed which is greater than 500 revolutions per minute, the low-speed governor 36 will be in the full extended position.

It will be observed that the governors 35 and 36 may be of the well known fly-ball type, the operation of which will be readily understood by those skilled in the art, and for this reason a detailed description of their operation will not be set forth in this specification.

The high-speed governor 35 is connected to control the position of the operating valve 27 by means of a connecting rod 37. As illustrated, the operating valve 27 is of the customary butterfly type which generally comprises a rotatable disc, the position of which may be varied to regulate the flow of fuel through the fuel inlet pipe 24.

In order to reduce the speed of the engine to idling speed when the load is removed, to reduce the wear of the engine, and further, to conserve fuel, the idling valve 28 is provided which, when closed, serves to completely shut off the flow of fuel through the pipe 24, with the exception of that fuel which is permitted to flow through a bleeder opening 38. While a bleeder opening 38 is illustrated in the idling valve 28 to provide for supplying only a sufficient amount of fuel to operate the engine 10 at idling speed, it will be readily understood that the idling valve 28 may be adjusted to a partially closed position, leaving a slight opening around the edges thereof to permit a small amount of fuel to flow.

The idling valve 28 is connected through a toggle joint 39 to a block 40 by means of a connecting rod 41. The block 40 is secured in the position illustrated in Fig. 2, to maintain the idling valve 28 in the closed position by means of a latch 42, with which a trigger 43, pivotally mounted on the block 40, is arranged to engage. The latch 42 is biased into engagement with the underside of the block 40 by means of a tension spring 44, while the trigger 43 is biased for rotation in a counter-clockwise direction by means of a spring 45.

With a view to releasing the idling valve 28 to the open position, the trigger 43 is provided with a cam surface which is arranged to cooperate with a corresponding cam surface on a cam 46, which is connected, by means of a connecting rod 47, to be operated by a low-speed governor 36. The cam 46 is provided with a slotted opening 46a, in which a guide pin 48, carried by the block 40, is disposed.

In order to effect the closure of the idling valve 28 when the load is removed from the engine 10, the connecting rod 37 is provided with a downwardly extending arm 50, which is connected, by means of a spring 51 and a rack 52, to the block 40. The rack 52 is provided with teeth 53 which are arranged to engage a pinion 54 on a time-delay mechanism, illustrated generally at 55. The time-delay mechanism 55 may be of any suitable type which will permit the movement of the valve 28 to the open position substantially instantaneously but which prevents the closure thereof until after the expiration of a predetermined time interval. Such a device is illustrated in the aforesaid copending application, in which a complete description of a device suitable for providing the desired time delay is set forth.

It will be observed that the teeth 53 are arranged to engage the corresponding teeth of the pinion 54 so that the latter will be rotated when the rack 52 is moved to the right. However, when the rack 52 is moved to the left, the shape of the teeth permits a ratchet operation so that the rack 52 may be moved to the left without the introduction of the time delay that is present when it is moved to the right.

Figure 6:
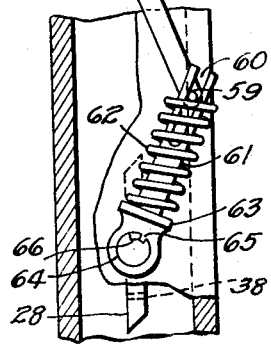
Fig. 6 is an enlarged view, partly in section, illustrating the toggle connection to the idling valve.

Referring now particularly to Fig. 6 of the drawings, it will be observed that the toggle joint 39 is illustrated in more detail. It is desirable to provide a connection of this type between the connecting rod 41 and the idling valve 28 in order to permit the operation of the time-delay mechanism 55, as initiated by the operation of the high-speed governor 35, until the expiration of the time for which the time-delay mechanism 55 is set without effecting an appreciable movement of the idling valve 28.

The toggle joint 39 comprises an operating lever 57 which may be connected to the connecting rod 41, as illustrated, and which is pivoted at 58. The lower end of the operating lever 57 is provided with a transversely extending pin 59, which is arranged to be slidably mounted in a slot 60 of an operating member 61. A spring 62 is disposed around the operating member 61 and between the pin 59 and a washer 63, which is secured at the lower end of the operating member 61. The operating member 61 is loosely mounted on a shaft 64 on which the idling valve 28 is mounted, and is provided with a detent 65 which is disposed to engage a corresponding slotted opening 66 in the shaft 64.

It will be apparent that the connecting rod 41 may be moved to rotate the operating lever 57 about the pivot point 58 without producing any movement of the idling valve 28 until the pin 59 is moved into alignment with the pivot point 58 and the shaft 64. In this position the detent 65 will engage one end of the slot 66, and, as the connecting rod 41 is moved slightly further, the spring 62 will immediately cause the idling valve 28 to snap to the closed position.

In operation, reference may be had to Figs. 2, 3, 4 and 5 of the drawings, in which the various operating conditions of the speed control apparatus are illustrated. Referring particularly to Fig. 2, it will be observed that the apparatus is there shown in the idling-speed position. At this position, the idling valve 28 is closed and fuel is supplied through the bleeder opening 38. The idling valve 28 is secured in the closed position by means of the latch 42, which is in engagement with the trigger 43. Since the idling speed is that at which the low-speed governor 36 will be in the full extended position, the balls thereof will be in, what may be termed, the full-out position, as shown. As illustrated, the balls of the high-speed governor 35 are in the full-in position. As long as no load is applied to the engine which is sufficient to reduce its speed from the idling speed, the control apparatus will remain in the condition illustrated in Fig. 2.

In the event that a sufficient load is applied to the engine 10, while it is operating at idling speed, to reduce the speed thereof below the idling speed, the low-speed governor 36 will be operated to a position which is illustrated in Fig. 3 of the drawings. Due to the reduction in speed of the engine 10, the balls of the low-speed governor 36 will be moved downwardly, with the result that the cam 46 will be moved to the left, thereby tripping the trigger 43 and releasing the block 40 and the connecting rod 41 for movement to the left under the influence of spring 29. When the toggle joint 39 has been moved past the position in which the pin 59 is aligned with the pivot point 58 and the shaft 64, the idling valve 28 will be operated to the open position, as illustrated. Because of the ratchet action between the rack 52 and the pinion 54, the time-delay mechanism 55 will not prevent the rapid movement of the block 40 to the left. At this instant, after the idling valve has been tripped to the open position, the speed of the engine 10 has not yet been raised to the operating speed. For this reason, the high-speed governor 35 is not changed in position.

As the engine 10 comes up to speed within the range of control of the high-speed governor 35, this governor then assumes control and regulates the position of the operating valve 27 in accordance with the load that is applied to the position by changing the position of the operating valve 27 as illustrated in Fig. 4 of the drawings. It will then be understood that the high-speed governor 35 controls the operation of the engine 10 while a load is being carried thereby at some predetermined operating speed.

The movement of the balls of the high-speed governor 35 is, as represented by the angle "a", ordinarily sufficient to provide a sufficient range of regulation to maintain the speed of the engine 10 substantially constant over the normal range which it is intended that the engine 10 shall operate. The movement of the high-speed governor 35 through the angle "a" causes varying tensions to be applied to the spring 51. However, during the operating range, a sufficient tension is not applied to the spring 51 to permit it to overcome the biasing force of the spring 29. As a result, the rack 52 is maintained in the position as illustrated.

Since the low-speed governor 36 is arranged to be sensitive only to speeds which are less than the idling speed, it will continue to rotate in the full extended position, but it will not be operative to effect any control functions.

In the event that the load is entirely removed from the engine, it will be necessary for the high-speed governor 35 to operate outside of its normal operating range, as indicated, by the movement through the angle "b" in Fig. 5 of the drawings, in order to sufficiently close the operating valve 27 to maintain the operation of the engine 10 within the predetermined speed for which the high-speed governor 35 is adjusted.

Because of the movement of the high-speed governor 35 beyond its normal range of movement, the spring 51 will be extended sufficiently to overcome the biasing force of the spring 29 and the block 40 will be urged to the right as a result. However, the movement of the block 40 to the right is limited by the time-delay mechanism 55, which permits the movement of the rack 52 to the right only at a speed which is determined by the setting of the time-delay mechanism 55. If the time interval, for which the time-delay mechanism 55 is adjusted, has elapsed, the block 40 will be moved to the right a distance sufficient to move the pin 59 of the toggle joint into alignment with the pivot point 58 and the shaft 64 on which the idling valve is mounted. A slight further movement of the block 40 will cause the idling valve 28 to snap to the closed position, thereby shutting off the flow of fuel to the engine, except as is provided for through the bleeder opening 38.

It will also be observed that the movement of the block 40 to the right causes the trigger 43 to again engage the latch 42, and as a result, the idling valve 28 is secured in the idling position. Since only a very small amount of fuel is supplied to the engine while the idling valve 28 is closed, the speed thereof will be decreased and the operating valve 27 will be moved to the full-open position on the contraction of the high-speed governor 35. The relative position of the governing mechanism will then be as illustrated in Fig. 2 of the drawings. On the reapplication of load while operating at the idling speed, the hereinbefore described cycle of operation may be repeated.

In the event that a load is reapplied to the engine 10 before the time interval, for which the time-delay mechanism 55 has been set, has elapsed, the high-speed governor 35 will return to position in the operating range, thereby releasing the tension applied to the spring 51 and permitting the spring 29 to restore the mechanism connected to the idling valve to the normal operating position. It will then be apparent that while the load may be reapplied to the engine 10 within the predetermined time interval during which the speed thereof is maintained at the operating speed after the load has been removed, the engine speed will be reduced to idling speed in order to conserve fuel and reduce wear on the movable parts of the engine, if the load is not reapplied within a predetermined time interval.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. Speed control apparatus for an internal combustion engine comprising, in combination, governing means for regulating the flow of fuel to the engine to maintain the speed thereof within a predetermined range of operating speeds, said governing means being disposed to reduce the flow of fuel to the engine to decrease the engine speed to idling speed a predetermined interval of time after the speed thereof exceeds the maximum operating speed, and additional governing means effective when the engine speed is less than idling speed to increase the flow of fuel to the engine to raise the speed thereof to operating speed.

2. Speed control apparatus for an internal combustion engine comprising, in combination, a fuel inlet pipe for the engine, an operating valve, an idling valve, said valves being disposed in tandem in the fuel inlet pipe, a low-speed governor responsive to the speed of the engine and operatively connected to the idling valve for effecting the opening thereof on application of load to the engine at idling speed, a high-speed governor responsive to the speed of the engine and operatively connected to the operating valve for controlling the flow of fuel to the engine during operating conditions, and control means operatively connecting the high-speed governor to the idling valve for initiating the closure thereof on removal of load from the engine.

3. Speed control apparatus for an internal combustion engine comprising, in combination, a fuel inlet pipe for the engine, an operative valve, an idling valve, said valves being disposed in tandem in the fuel inlet pipe, a low-speed governor responsive to the speed of the engine and operatively connected to the idling valve for effecting the opening thereof on application of load to the engine at idling speed, a high-speed governor responsive to the speed of the engine and operatively connected to the operating valve for controlling the flow of fuel to the engine during operating conditions, control means operatively connecting the high-speed governor to the idling valve for initating the closure thereof on removal of load from the engine, and time-delay means operatively connected to said control means to permit the closure of the idling valve after a predetermined time interval.

4. Speed control apparatus for an internal combustion engine comprising, in combination, a fuel inlet pipe for the engine, an operating valve, an idling valve, said valves being disposed in tandem in the fuel inlet pipe, high-speed governing means responsive to the speed of the engine and operatively connected to the operating valve for regulating the flow of fuel to the engine to maintain the operating speed thereof within a predetermined range of speed, operating means connecting the high-speed governor to the idling valve for effecting the closure thereof when the engine speed exceeds a predetermined speed to reduce the speed of the engine to idling speed, latching means operatively connected to the idling valve for securing it in the closed position, and low-speed governing means responsive to the speed of the engine and disposed to trip the latching means, thereby releasing the idling valve to the open position when the speed of the engine is less than idling speed.

5. Speed control apparatus for an internal combustion engine comprising, in combination, a fuel inlet pipe for the engine, an operating valve, an idling valve, said valves being disposed in tandem in the fuel inlet pipe, high-speed governing means responsive to the speed of the engine and operatively connected to the operating valve for regulating the flow of fuel to the engine to maintain the operating speed thereof within a predetermined range of speed, operating means connecting the high speed governor to the idling valve for effecting the closure thereof when the engine speed exceeds a predetermined speed to reduce the speed of the engine to idling speed, time-delay means connected to the idling valve to prevent the closure thereof before the expiration of a predetermined time interval after the engine exceeds the predetermined range of operating speed, latching means operatively connected to the idling valve for securing it in the closed position, and low-speed governing means responsive to the speed of the engine and disposed to trip the latching means, thereby releasing the idling valve to the open position when the speed of the engine is less than idling speed.

6. Speed control apparatus for an internal combustion engine comprising, in combination, a fuel inlet pipe to the engine, an operating valve, an idling valve, said valves being disposed in tandem in the fuel inlet pipe, high-speed governing means responsive to the speed of the engine and operatively connected to the operating valve for regulating the flow of fuel to the engine to maintain the speed thereof within a predetermined range of operating speeds, operating means connected to the high-speed governing means and toggled to the idling valve for operating the idling valve to the closed position when the engine speed exceeds the maximum operating speed, latching means for securing the idling valve in the closed position, and low-speed governing means responsive to the speed of the engine and disposed to trip the latching means when the engine speed is less than idling speed to permit the idling valve to open, thereby increasing the flow of fuel to the engine to raise the speed thereof to operating speed.

7. Speed control apparatus for an internal combustion engine comprising, in combination, a fuel inlet pipe to the engine, an operating valve, an idling valve, said valves being disposed in tandem in the fuel inlet pipe, high-speed governing means responsive to the speed of the engine and operatively connected to the operating valve for regulating the flow of fuel to the engine to maintain the speed thereof within a predetermined range of operating speed, operating means connected to the high-speed governing means and toggled to the idling valve for operating the idling valve to the closed position when the engine speed exceeds the maximum operating speed, latching means for securing the idling valve in the closed position, time-delay means connected to the latching means to permit the operating thereof at the expiration of a predetermined time interval after the load is removed from the engine, and low-speed governing means responsive to the speed of the engine and disposed to trip the latching means when the engine speed is less than idling speed to permit the idling valve to open, thereby increasing the flow of fuel to the engine to raise the speed thereof to operating speed.

8. Speed control apparatus for an internal combustion engine comprising, in combination, a fuel inlet pipe to the engine, an operating valve, an idling valve, said valves being disposed in tandem in the inlet pipe, a high-speed governor responsive to the speed of the engine and operatively connected to the operating valve for regulating the flow of fuel to the engine to maintain the speed thereof within a predetermined range of operating speeds as the load driven by the engine is changed, toggle means operatively connected to the idling valve, resilient means connected to the toggle means for biasing the idling valve to the open position, resilient connecting means disposed between the toggle means and the high-speed governor for actuating the idling valve to the closed position when the load is removed from the engine, thereby reducing the engine speed to idling speed, latching means for securing the idling valve in the closed position, and a low-speed governor responsive to the speed of the engine and disposed to trip the latching means when the engine speed is reduced to less than idling speed to permit the idling valve to open, thereby increasing the flow of fuel to the engine to raise the speed thereof to operating speed.

9. Speed control apparatus for an internal combustion engine comprising, in combination, a fuel inlet pipe to the engine, an operating valve, an idling valve, said valves being disposed in tandem in the inlet pipe, a high-speed governor responsive to the speed of the engine and operatively connected to the operating valve for regulating the flow of fuel to the engine to maintain the speed thereof within a predetermined range of operating speeds as the load driven by the engine is changed, toggle means operatively connected to the idling valve, resilient means connected to the toggle means for biasing the idling valve to the open position, resilient connecting means disposed between the toggle means and the high-speed governor for actuating the idling valve to the closed position when the load is removed from the engine thereby reducing the engine speed to idling speed, latching means for securing the idling valve in the closed position, time-delay means connected to the latching means to permit the latching thereof at the expiration of a predetermined time interval after the load is removed from the engine, and a low-speed governor responsive to the speed of the engine and disposed to trip the latching means when the engine speed is reduced to less than idling speed to permit the idling valve to open, thereby increasing the flow of fuel to the engine to raise the speed thereof to operating speed.

10. Apparatus for controlling the speed of an internal combustion engine comprising, in combination, a fuel inlet pipe to the engine, an operating valve, an idling valve, said valves being disposed in tandem in the inlet pipe, governing means for controlling the operation of the operating valve to regulate the fuel supplied to the engine in accordance with the load driven by the engine, said governing means being operatively connected to the idling valve to effect the closure thereof on removal of the load from the engine, said connection to the idling valve being characterized by the provision of means to permit a predetermined movement of the connection without effecting movement of the idling valve, latching means for securing the idling valve in the closed position, and means responsive to the application of load to the engine at idling speed for tripping the latching means to permit the idling valve to be operated to the open position.

11. Apparatus for controlling the speed of an internal combustion engine comprising, in combination, a fuel inlet pipe to the engine, an operating valve, an idling valve, said valves being disposed in tandem in the inlet pipe, governing means for controlling the operation of the operating valve to regulate the fuel supplied to the engine in accordance with the load driven by the engine, said governing means being operatively connected to the idling valve to effect the closure thereof on removal of the load from the engine, said connection to the idling valve being characterized by the provision of means to permit a predetermined movement of the connection without effecting movement of the idling valve, latching means for securing the idling valve in the closed position, time-delay means connected to the latching means to permit the operation thereof at the expiration of a predetermined time interval after the load is removed from the engine, and means responsive to the application of load to the engine at idling speed for tripping the latching means to permit the idling valve to be operated to the open position.

12. Apparatus for controlling the speed of an internal combustion engine comprising, in combination, fuel regulating means for controlling the flow of fuel to the engine, governing means responsive to the speed of the engine and operatively connected to the fuel regulating means for maintaining the engine speed within a predetermined operating range, timing means connected to the fuel regulating means for maintaining the engine operating within said operating range for a predetermined interval of time after the load is removed from the engine, control means operated by the governing means for initiating the operation of the fuel regulating means to the idling position, and means disposed to restore the fuel regulating means to the operating condition on reapplication of load to the engine within said predetermined interval of time.

13. Apparatus for controlling the speed of an internal combustion engine comprising, in combination, fuel regulating means for controlling the flow of fuel to the engine, governing means responsive to the speed of the engine and operatively connected to the fuel regulating means for maintaining the engine speed within a predetermined operating range, timing means connected to the fuel regulating means for maintaining the engine operating within said operating range for a predetermined interval of time after the load is removed from the engine, control means operated by the governing means for initiating the operation of the fuel regulating means to the idling position, means disposed to restore the fuel regulating means to the operating condition on reapplication of load to the engine within said predetermined interval of time, latching means for securing the fuel regulating means in the idling speed position, and additional governing means operable in accordance with a predetermined decrease in the engine speed from idling speed to trip the latching means, thereby effecting the restoration of the fuel regulating means to the operating condition.

14. Apparatus for controlling the speed of an internal combustion engine comprising, in combination, a fuel inlet pipe to the engine, an operating valve, an idling valve, said valves being disposed in tandem in the fuel inlet pipe, a high-speed governor, a low-speed governor, said governors being responsive to the speed of the engine, interconnecting means disposed between the operating valve and the high-speed governor, additional interconnecting means disposed between the idling valve and the low-speed governor, said high-speed governor being effective to regulate the flow of fuel to the engine to maintain the speed thereof within a predetermined operating range, said low-speed governor being effective to release the idling valve to the open position on application of load to the engine while operating at idling speed, interacting means including unidirectional time-delay means connected between said interconnecting means to effect the closure of the idling valve a predetermined interval of time after load is removed from the engine.

15. Apparatus for controlling the speed of an internal combustion engine comprising, in combination, means responsive to the speed of the engine and disposed to regulate the flow of fuel to the engine to maintain the speed thereof within a predetermined operating range in accordance with the load driven by the engine, time-delay means disposed to maintain the engine operating within said operating range of speed for a predetermined time interval after the load is removed from the engine, and means for rendering said time-delay means ineffective on reapplication of load to the engine within said time interval.

16. Apparatus for controlling the speed of an internal combustion engine comprising, in combination, means responsive to the speed of the engine and disposed to regulate the flow of fuel to the engine to maintain the speed thereof within a predetermined operating range in accordance with the load driven by the engine, time-delay means for reducing the engine speed to idling speed a predetermined interval of time after the load is removed from the engine, means adapted to render said time-delay means ineffective to reduce the engine speed to idling speed on reapplication of load to the engine within said time interval, and means effective to increase the flow of fuel to the engine on application of load while operating at idling speed to raise the speed to operating speed.

JOHN L. BROWN.